United States Patent [19]

Davis et al.

[11] 4,439,036
[45] Mar. 27, 1984

[54] LARGE DOCUMENT ACCESS FOR A SCANNING SYSTEM OF A COPYING MACHINE

[75] Inventors: James W. Davis, Richardson; Bradley W. Larson, Garland; Barry C. Kockler, Lewisville; Daniel T. Noonan, Irving; N. Flynt Moreland, Mesquite; Lonnie K. Spears, Murphy, all of Tex.

[73] Assignee: The Mead Corporation, Dayton, Ohio

[21] Appl. No.: 355,410

[22] Filed: Mar. 8, 1982

[51] Int. Cl.³ .......................................... G03B 27/62
[52] U.S. Cl. .................................... 355/75; 355/25; 355/3 SH
[58] Field of Search ................... 355/75, 25, 64, 65, 355/3 SH

[56] References Cited

U.S. PATENT DOCUMENTS

| | | | |
|---|---|---|---|
| 3,623,806 | 11/1971 | Short | 355/75 |
| 3,700,231 | 10/1972 | Aasen et al. | 271/65 |
| 3,726,589 | 4/1973 | Difulvio et al. | 355/25 |
| 3,829,083 | 8/1974 | Shiina et al. | 271/4 |
| 4,043,665 | 8/1977 | Caldwell | . |
| 4,135,805 | 1/1979 | Taylor et al. | . |
| 4,355,887 | 10/1982 | Sorimachi | 355/25 |

Primary Examiner—Monroe H. Hayes
Attorney, Agent, or Firm—Biebel, French & Nauman

[57] ABSTRACT

The utility of a document exposing system for a copying machine that has a separate exposure platen for bulky documents with a cover containing a transport mechanism, is improved by providing for the platen cover to swing up and away from the platen by being pivoted on a horizontal hinge axis that is remote the rear edge of the platen and by providing for the single sheet document feeder to pivot away from the side of the platen by turning about a vertical axis located behind the back edge of the platen. Thus, an open, unobstructed volume over and at the side of the platen is provided whereby pages of extremely large bound volumes may be copied.

6 Claims, 10 Drawing Figures

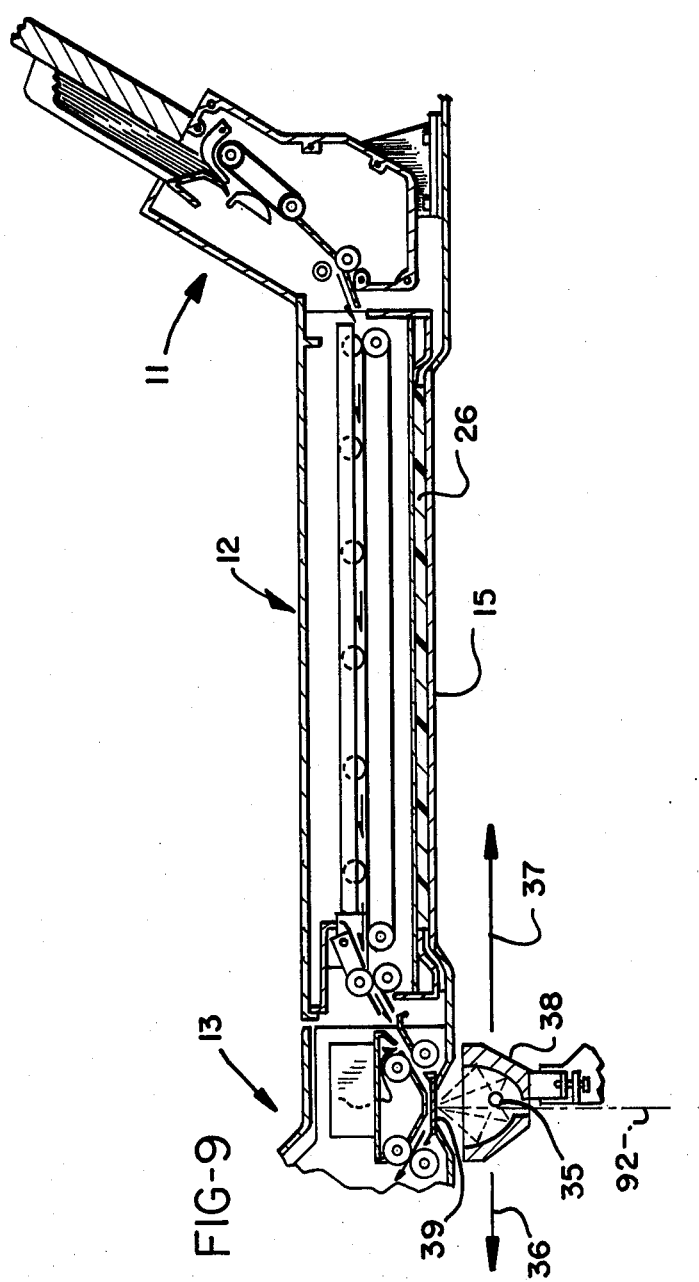

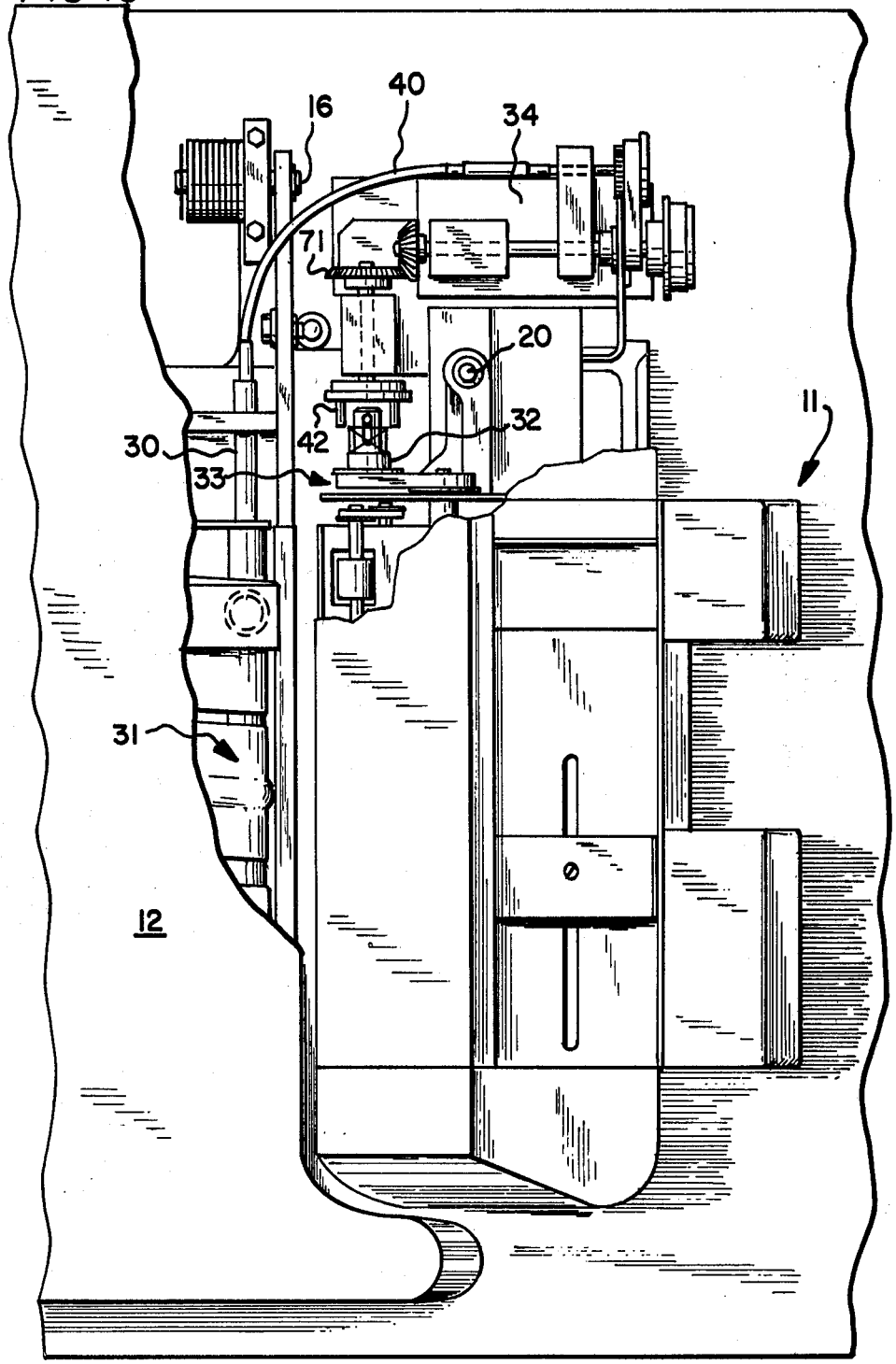

LARGE DOCUMENT ACCESS FOR A SCANNING SYSTEM OF A COPYING MACHINE

SUMMARY OF THE INVENTION

This invention relates to apparatus that provides a large volume of access space adjacent a large document copying platen of a copying machine. The platen cover which contains an individual sheet transport mechanism is pivoted so as to swing up and away from the platen by being hinged about a horizontal axis substantially removed from the edge of the platen thus providing for the placement of relatively thick materials all the way to the back edge of the platen, and at the same time, a more uniform pressure on thick items from the pressure pad in the cover. The original document feeder is hinged about a vertical axis providing for it to swing away from its position of cooperation with the transport mechanism to a position providing a long, clear side access area, the width of the platen, at platen level so that pages of large books and bound volumes, such as plat books, record books and the like, may be conveniently copied.

It is thus an object of the present invention to provide apparatus for a compact document exposing system of a copying machine that will accommodate copying of extremely large bound volumes.

It is a further object of the present invention to provide a pivotable original document feeder that may be swung away from its normal operation position to provide a large side access area to the large document platen.

It is still a further object of the invention to provide a mechanical drive system for a sheet document transport system and for a document feeder system wherein the transport mechanism may be lifted from its operating position and the feeder system may be swung away from its operating position to provide for copying bulky items, and both the transport mechanism and the feeder system may be returned to their normal sheet document handling position without further adjustment.

These and other objects will become more apparent from the following description and drawings.

BRIEF DESCRIPTION OF THE DRAWINGS

FIG. 9 is a partial pictorial-schematic elevation section view illustrating the traveling light source for exposing documents; and FIG. 10 is a pictorial-schematic view illustrating still another embodiment of a mechanical drive arrangement.

DESCRIPTION OF THE PREFERRED EMBODIMENT

Figure 1:
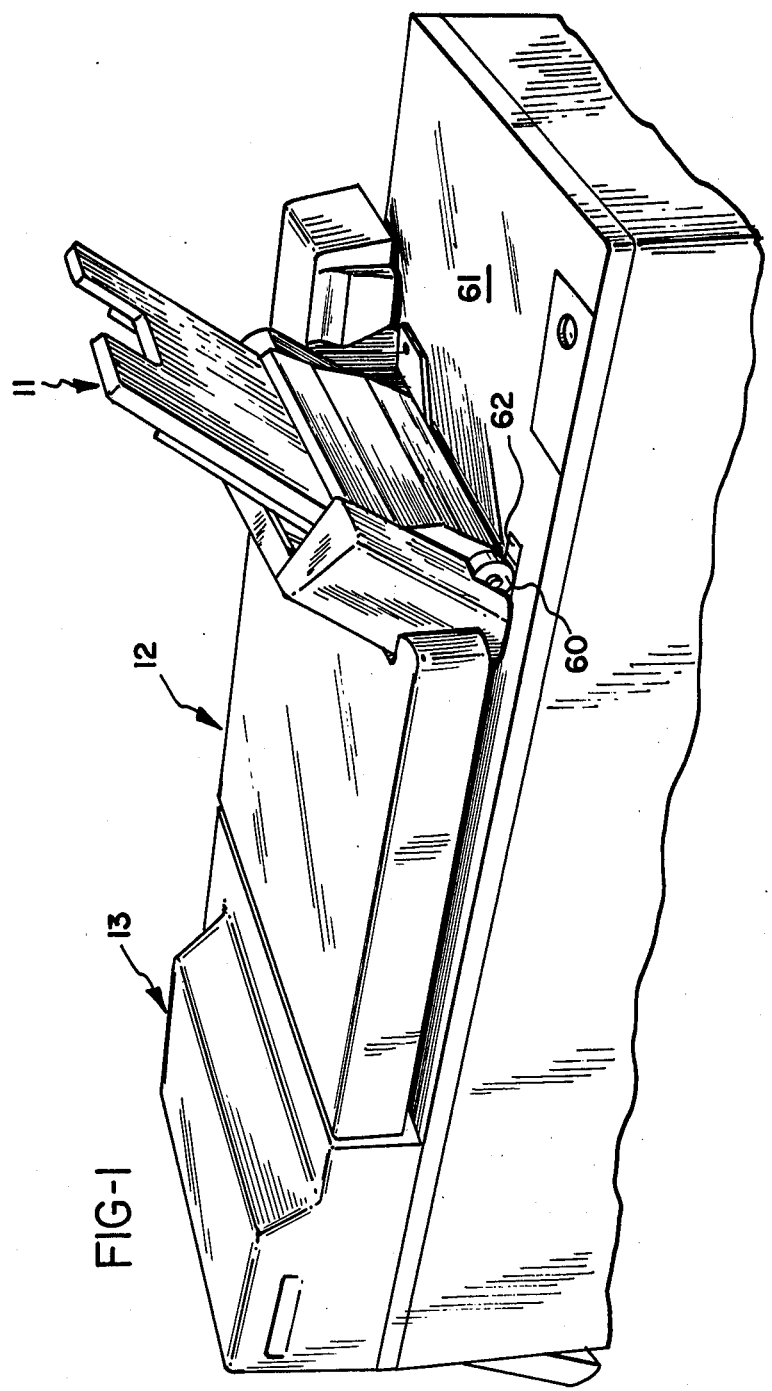
FIG. 1 is a pictorial view of a top portion of a scanning system of a copying machine illustrating an embodiment of the invention.

FIG. 1 pictorially illustrates the top portion of a scanning system of a copying machine. It is shown in the position for automatic copying of individual sheet original documents. The original document sheets are placed in the original document feeder 11 which feeds them one-at-a-time to a sheet document transport and handling mechanism contained in the cover 12. The transport mechanism aligns the sheets to a reference position and feeds them to the exposure station 13 where one or both sides of the documents may be exposed for copying as the sheets travel through the device.

Figure 2:
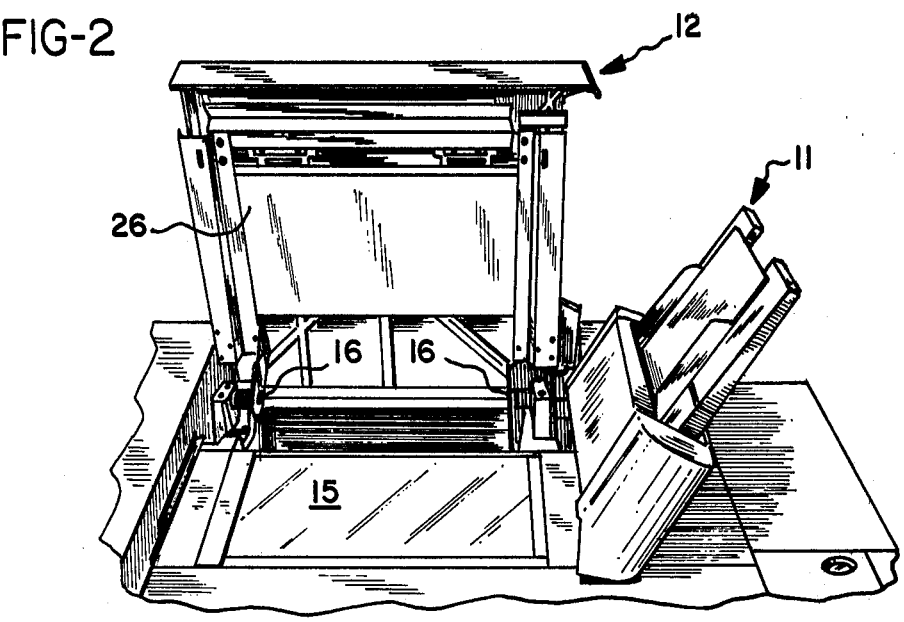
FIG. 2 is a pictorial view illustrating the lifting of the platen cover.
Figure 3:
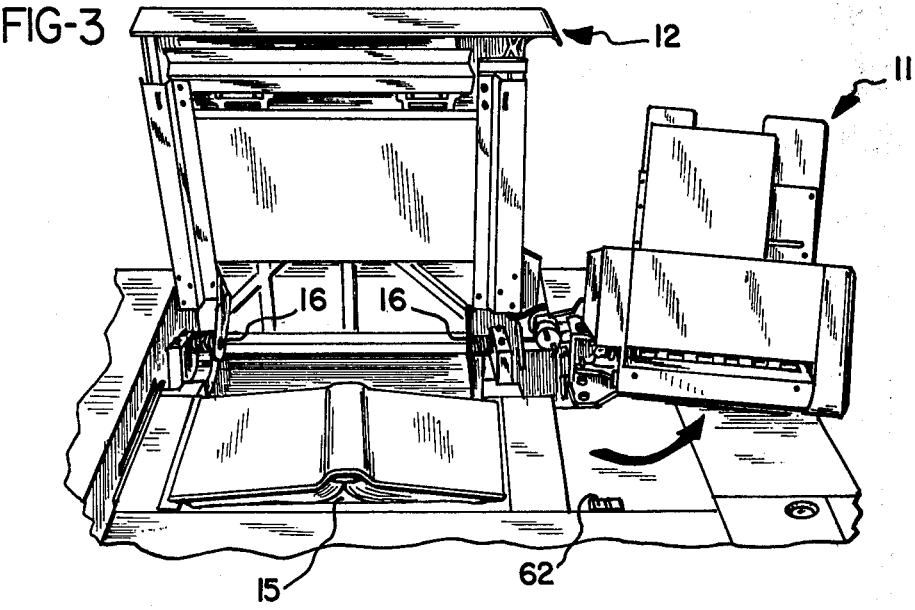
FIG. 3 is a pictorial view illustrating the swinging away of the sheet document feeder.
Figure 4:
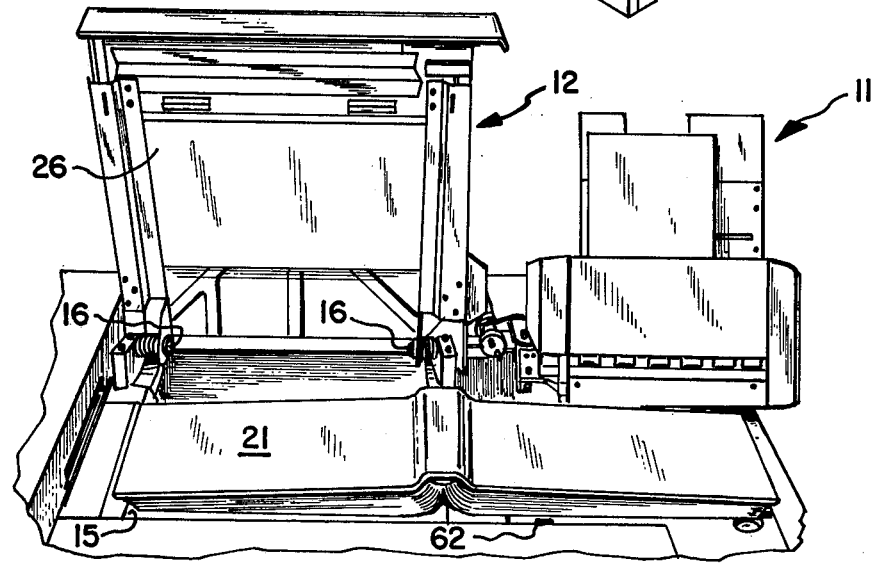
FIG. 4 is a pictorial view illustrating the copying of a page of an extremely large bound volume.

To copy bound volumes and other large, bulky volumes, the platen cover 12 is raised as illustrated in FIG. 2. Raising the cover 12 provides access to platen 15 so that material may be placed thereon for copying. It is to be noted that platen 15 is not used for the automatic copying of single sheets. In addition to the pivoting of cover 12 up and away from platen 15 about horizontal hinge axis 16, the original document feeder 11 is swung away from the platen area by pivoting about vertical hinge axis 20, as illustrated in FIG. 3. (Also, see FIGS. 6 and 10). This provides an extremely large, unobstructed volume about the platen so that pages of large record books 21 may be copied as illustrated in FIG. 4.

FIG. 9 illustrates a typical traveling illuminator 38 containing line light source 35. Illuminator 38 is moved 36–37, by a motor driven drive mechanism, parallel to large document platen 15, automatic front side exposure station 39, and automatic back side exposure station (not illustrated). In the illustration of FIG. 9, the platen cover 12 is shown closed, and the original document feeder 11 is in position for automatically feeding single sheet original documents past front side exposure station 39. When automatically copying only the front side of sheet documents, illuminator 38 remains in the position shown in FIG. 9. For copying large bulky documents, platen cover 12 is raised, document feeder 11 is swung away, the document to be copied placed face down on platen 15, and illuminator 38 is electrically activated to move 37 so as to sweep the document with light at the second elliptical focal point of illuminator 38, the line light source 35 being at the first elliptical focal point. As the intense light is swept over the face of the document, an optical scanning signal is reflected from the document along line 92 to photodetection and associated apparatus to provide an electrical signal for further processing in the copying of the document.

Figure 5:
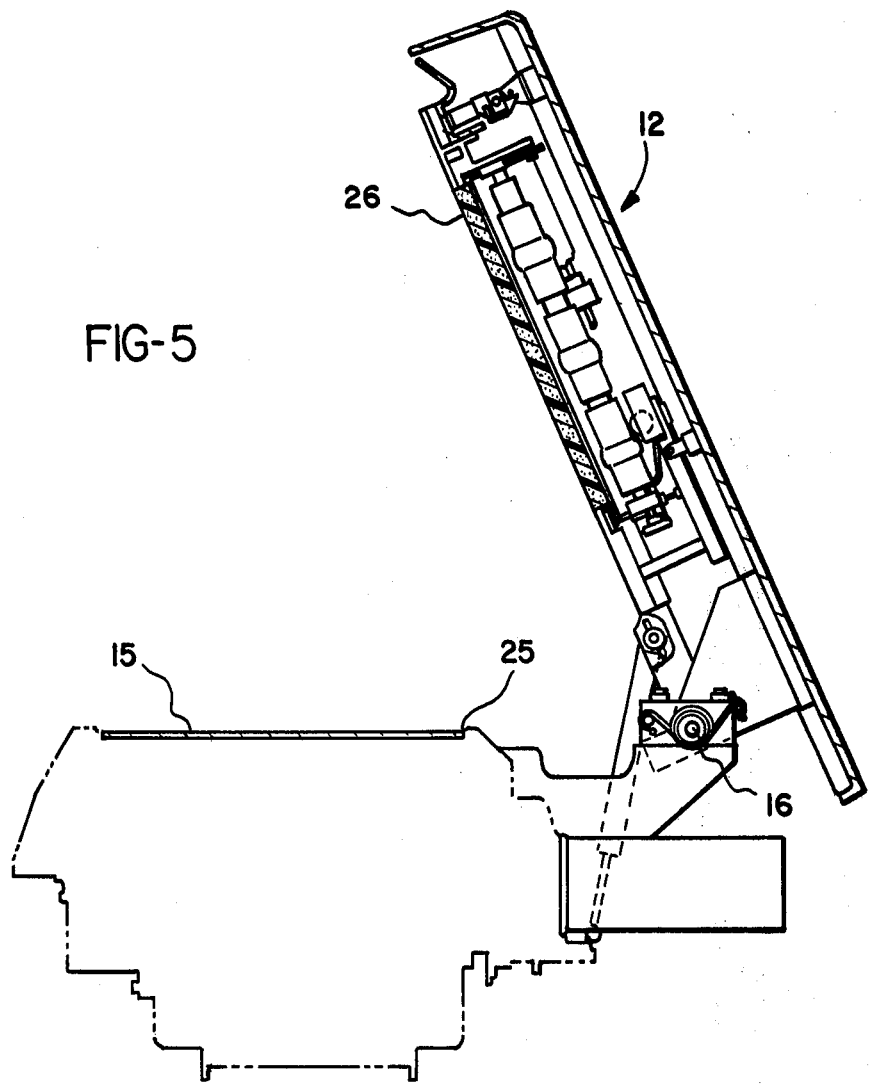
FIG. 5 is a schematic-pictorial partial section view illustrating the position of the hinge axis of the platen cover remote the edge of the platen.

Conventional platen covers are hinged relatively close to the edge of the platen. This means that, to accommodate large volumes, the cover must be raised to or past the vertical position complicating counterbalancing the cover and providing, when the cover is closed on the bound volume or other bulky document being copied, a large variation in pressure on the document and a large light leakage due to the large angle that the cover makes with the platen. By locating the horizontal hinge axis 16 of the platen cover a substantial distance away from the edge 25 of the platen 15 as illustrated in FIG. 5, the platen cover 12 need not be raised through such a large angle to provide a large unobstructed volume over the platen. Typically, placing the hinge axis of the platen approximately two-thirds the platen width from the edge of the platen and providing for raising the cover to approximately an angle of about 66° have been found optimal. Providing such volume over the platen further allows a book break area along the platen registration edge. Also, the removing of the hinge axis of the cover from the edge of the platen provides a more uniform pressure on the material being copied by the pressure pad 26 contained in the cover 12.

The placing of feeder hinge pivot 20 a distance from the rear edge 25 of the platen that is equal to or greater than the distance that the hinge pin is back of the edge of the feeder facing the cover will provide for the feeder to swing clear of the side of the platen.

Figure 7:
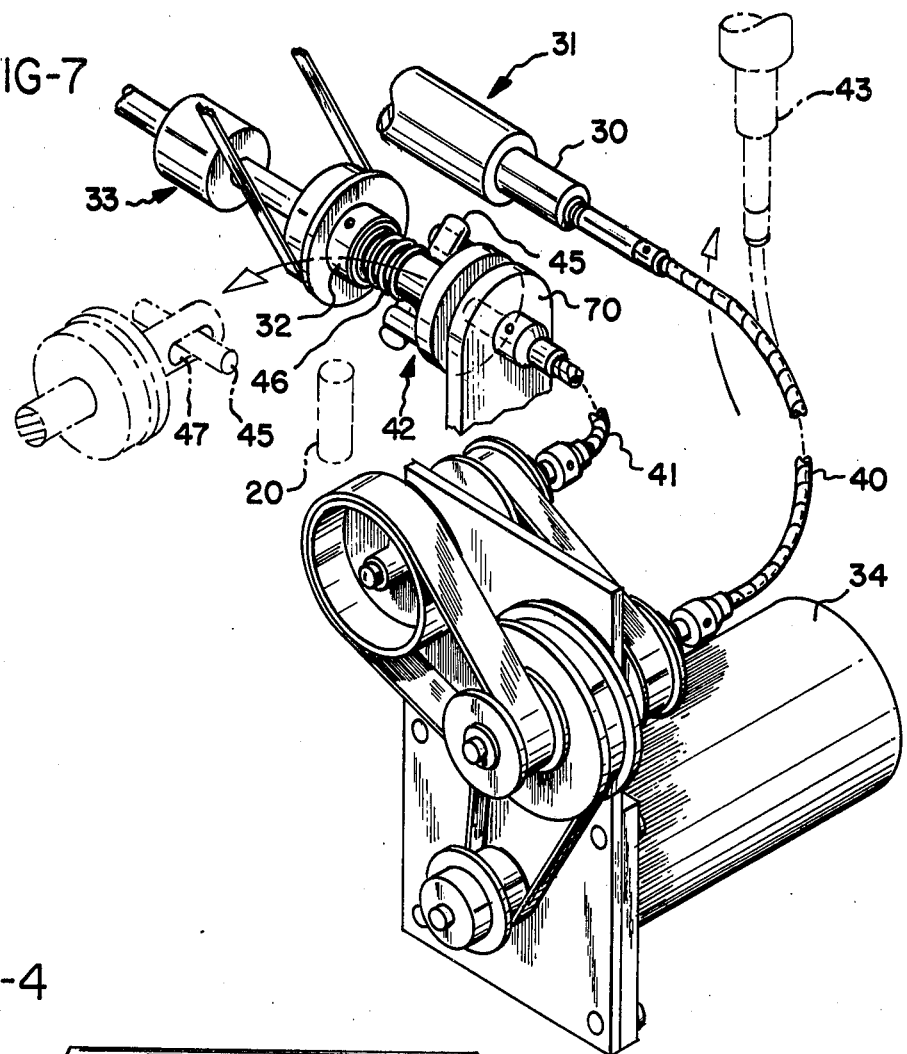
FIG. 7 is an enlarged schematic view of a drive arrangement.
Figure 6:
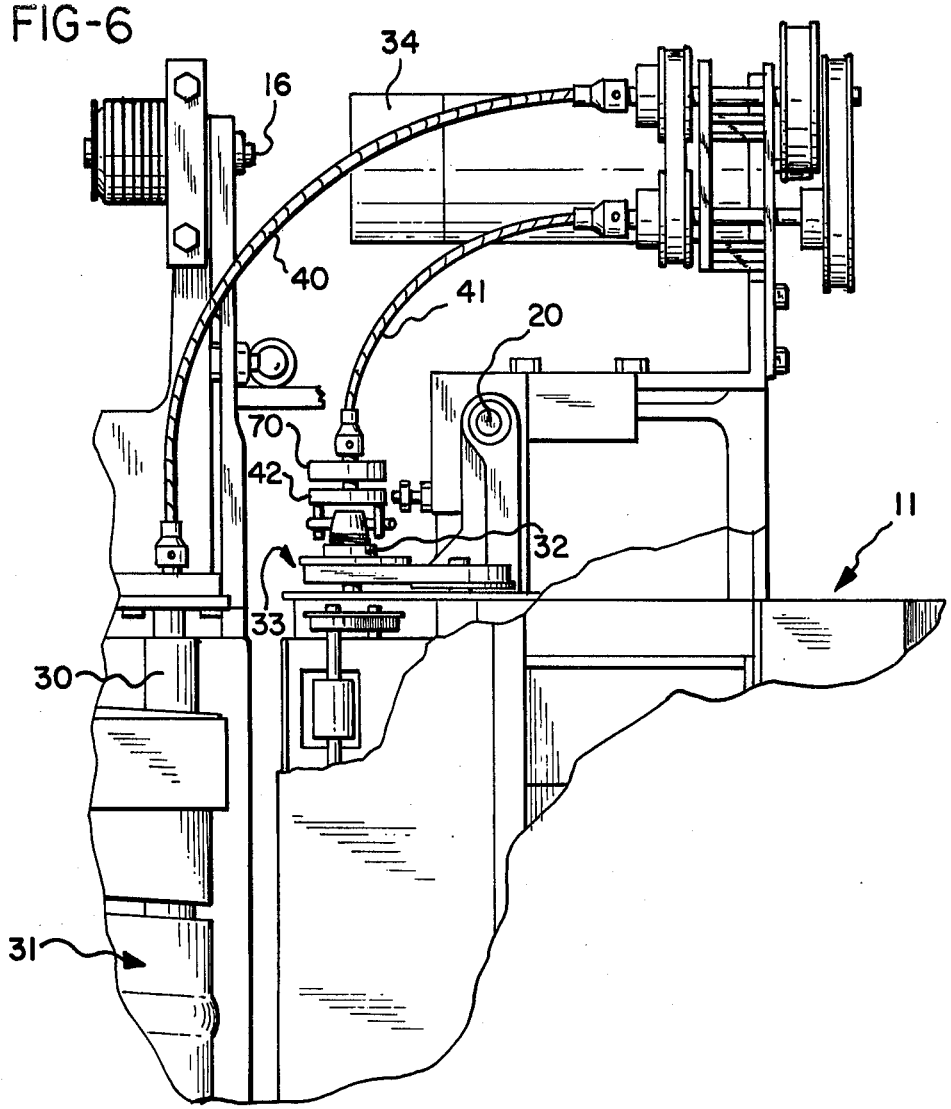
FIG. 6 is a pictorial-schemtic view illustrating a mechanical drive arrangement.

In the individual sheet copying mode, as illustrated in FIGS. 1, 6, and 9, it is essential that mechanical power be applied as illustrated in FIGS. 6 and 7 to the input drive 30 of the transport and handling mechanism 31 and to the input drive 32 of the feeder mechanism 33. The coupling of mechanical power from electric motor 34 to the transport and handling mechanism and to the feeder mechanism must be such that they may be readily pivoted from the individual sheet copying operating mode, as illustrated in FIGS. 1 and 6, to the large document copying mode, as illustrated in FIGS. 3 and 4, and back again to the single sheet copying mode without complication or operator involvement other than lifting and lowering the cover and pushing away and pulling back the feeder.

The preferred drive arrangement, as illustrated in FIGS. 6 and 7, comprises motor energy source 34, belt coupled to flexible shafts 40 and 41. Flexible shaft 40 provides for the transport mechanism contained in the platen cover to be lifted from a relatively horizontal position for single sheet automatic copying operation to a relatively vertical position by flexing, as illustrated in phantom 43, to provide access to the large document platen.

Flexible shaft 41 is connected to drive feeder mechanism 33 through dog clutch drive disconnect 42. When the sheet document feeder 11 is swung away from the platen area, by pivoting about vertical axis 20, dog clutch 42 disconnects, as illustrated in phantom 44 in FIG. 7. Shaft 41 is maintained in proper alignment by retainer 70. Bar member 45 is spring loaded by spring 46 and free to move in slot 47 to preclude any mechanical interference when the feeder is swung back yet provide positive engagement as soon as the drive member turns. With positive mechanical coupling to both the feeder and the transport mechanism from a common motor, proper synchronism between the feeder and transport device is maintained.

Feeder 11 has wheel 60 to facilitate retention of the feeder mechanism in position for single sheet automatic copying. Wheel 60 rests in indicating detent 62 when the feeder 11 is properly positioned in the single sheet automatic copying mode.

An alternative drive arrangement is shown in FIG. 10 in which motor 34 supplies mechanical energy to feeder mechanism 33 through bevel gears 71 rather than a flexible shaft 41.

Figure 8:
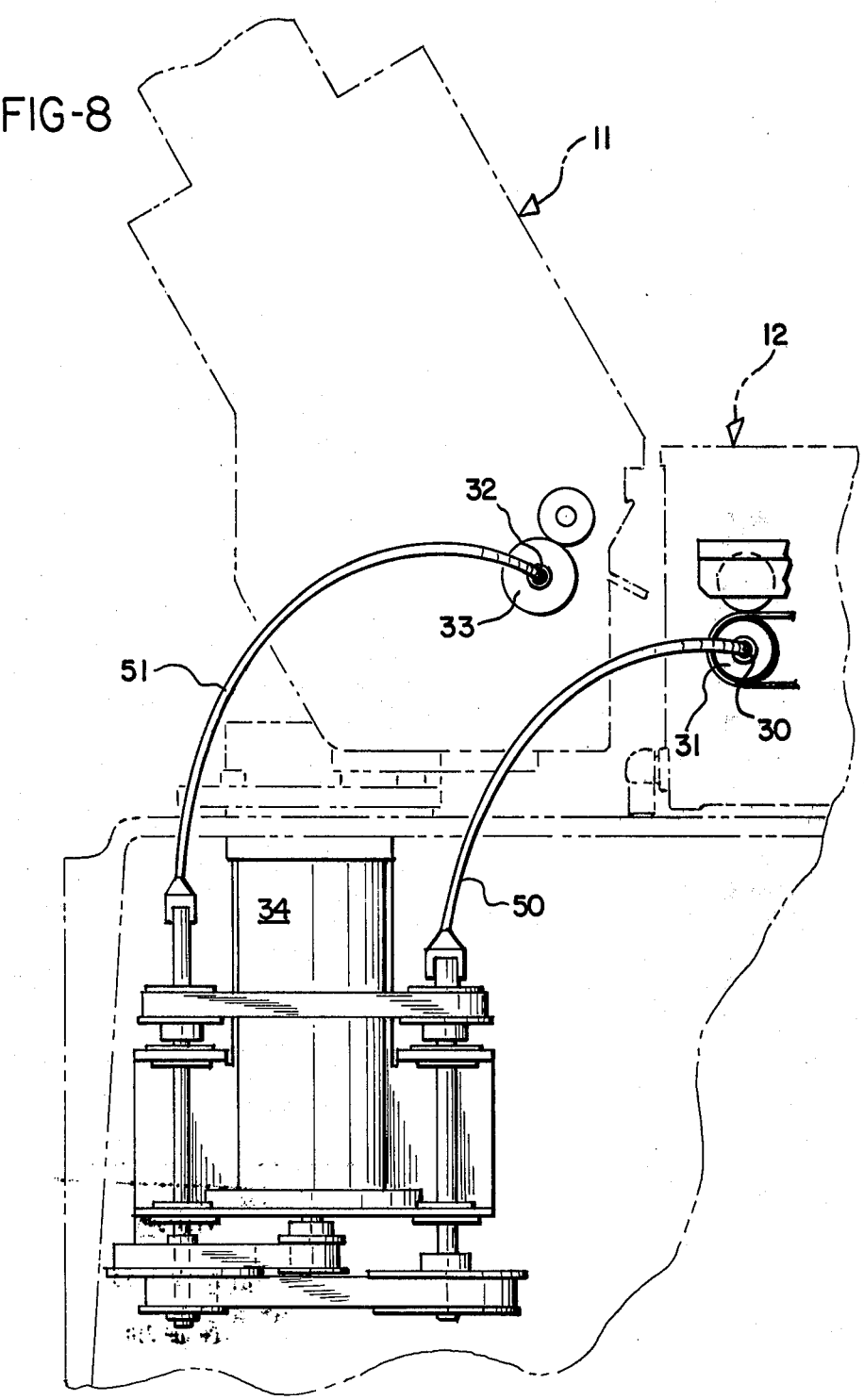
FIG. 8 is a pictorial-schematic view illustrating another embodiment of a drive system for a pivotable feeder and a pivotable transport device providing a large access area to the large document platen.

A further alternative drive arrangement is illustrated in FIG. 8 in which motor 34 supplies mechanical energy to drive inputs 30 and 32 of transport mechanism 31 and feeder mechanism 33, respectively, through flexible shafts 50 and 51, respectively.

While the form of apparatus herein described constitutes a preferred embodiment of the invention, it is to be understood that the invention is not limited to this precise form of appartus, and that changes may be made therein without departing from the scope of the invention.

What is claimed is:

1. In a copying machine comprising a frame, an exposure platen mounted in said frame for exposing bulky documents, an exposure station mounted in said frame separate from said exposure platen for exposing sheet type documents, a platen cover for covering said exposure platen, sheet transport means having a drive input positioned within said platen cover for transporting said sheet documents to said exposure station, sheet feeder means having a drive input for receiving original sheet documents and feeding said sheet documents to said transport means, the improvement comprising:
   a. means for pivotably mounting said platen cover containing said transport means to said frame in swing-up relationship from a lowered single sheet operating position to a raised position for providing access to said exposure platen;
   b. means for pivotably mounting said feeder means in a swing-away relationship from single sheet operating position of cooperation with said transport means when said cover is in lowered position, to a removed position to provide side access to said platen; and
   c. means cooperating with said drive input to said transport means and with said drive input to said feeder means for actuating said transport and said feeder means when said transport means and said feeder means are in a sheet copying position.

2. The improvement as claimed in claim 1 wherein said side access is substantially at platen level.

3. The improvement as claimed in claim 2 wherein said means for pivotably mounting said platen cover includes a hinge axis substantially removed from said platen.

4. The improvement as claimed in claim 3 wherein said means for pivotably mounting said feeder includes a hinge axis positioned to the rear of the rear edge of said platen.

5. The improvement as claimed in claim 3 wherein said means for pivotably mounting said platen cover includes a hinge axis set back from the rear edge of said platen a distance approximately equal to two thirds the distance from the front edge to the rear edge of said platen.

6. The improvement as claimed in claim 1 wherein said sheet feeder means is driven by a driving arrangement comprising a drive motor which rotates about a horizontal axis, a dog clutch which is driven by said motor and power take-off means which engage said dog clutch when said sheet feeding device is swung into an operating position.

* * * * *